US008089884B2

(12) United States Patent
Liu (10) Patent No.: US 8,089,884 B2
(45) Date of Patent: Jan. 3, 2012

(54) METHOD AND APPARATUS FOR EARLY WARNING OF CONGESTION IN AD-HOC WIRELESS NETWORKS

(75) Inventor: Yu-Jih Liu, Ledgewood, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 864 days.

(21) Appl. No.: 12/098,602

(22) Filed: Apr. 7, 2008

(65) Prior Publication Data

US 2011/0044169 A1    Feb. 24, 2011

(51) Int. Cl.
*H04L 1/00* (2006.01)
(52) U.S. Cl. ........................ 370/237; 370/252
(58) Field of Classification Search .......... 370/229–238, 370/252–253, 254–255, 337, 347, 442–445, 370/458, 459, 498
See application file for complete search history.

(56) References Cited

U.S. PATENT DOCUMENTS

| | | | |
|---|---|---|---|
| 2004/0047314 A1 | 3/2004 | Li | |
| 2006/0268792 A1* | 11/2006 | Belcea | 370/338 |
| 2008/0056125 A1* | 3/2008 | Kneckt et al. | 370/229 |
| 2008/0298250 A1* | 12/2008 | Larsson | 370/238 |

FOREIGN PATENT DOCUMENTS

WO    2007053141 A1    5/2007

OTHER PUBLICATIONS

Hyung-Won Cho, et al., "A Centralized Hybrid MAC Protocol for Wireless Sensor Networks," Intelligent Sensors, Sensor Networks and Information, 2007. ISSNIP 2007. 3rd International Conference on. Mar, 1, 2008; DOI: 10.1109/ ISSNIP.2007.4496886.
European Search Report dated Aug. 6, 2009; cited in EP Application No. 09155443.6.
Kang Yong Lee et al., "Cross Layered Hop-by-Hop Congestion Control for Multihop Wireless Networks," 2006 IEEE International Conference on Mobile AdHoc and Sensor Systems, Oct. 1, 2006, pp. 485-488, XP 01003866.
European Communication Dated Mar. 30, 2010.
Duc A. Tran, Harish Raghavendra, "Congestion Adaptive Routing in Mobile Ad Hoc Networks," IEEE Transactions on Parallel and Distributed Systems, vol. 17, No. 11, Nov. 2006. Golnaz Karbaschi, Anne Fladenmuller, "A Link-Quality and Congestion-Aware Cross Layer Metric for Multi-Hop Wireless Routing," IEEE, 2005.
Jaewon Kang, Yanyong Zhang, Badri Nath, "Accurate and Energy-Efficient Congestion Level Measurement in Ad Hoc Networks," IEEE Communications Society/ WCNC 2005, pp. 2258-2263.
Xu Li, Zheng Bao-Yu, "Study on Cross-Layer Design and Power Conservation in Ad Hoc Network," IEEE 2003.

* cited by examiner

*Primary Examiner* — Pao Sinkantarakorn
(74) *Attorney, Agent, or Firm* — Edell, Shapiro & Finnan, LLC (57) ABSTRACT

The present invention embodiments bypass congested links in a multi-hop Ad-Hoc wireless network. Initially, congestion is measured at each network node based on channel utilization for both transmission and reception of TDMA and CSMA messages. The measured utilization is quantized to conserve transmission bandwidth. Non-uniform quantization is applied to enable the measured utilization to be quantized to the highest value within the quantization range prior to occurrence of congestion, thereby effectively providing early notification of the congestion. The quantized utilization is distributed with the original use costs of a communication link to the remaining network nodes by a Link State Advertisement (LSA) flood and supplemental ACK and/or HELLO packets. After a network node receives the quantized utilization, the link cost is updated and used to select a routing path that minimizes the total costs from the source node to the destination node for a multi-hop network.

42 Claims, 4 Drawing Sheets

METHOD AND APPARATUS FOR EARLY WARNING OF CONGESTION IN AD-HOC WIRELESS NETWORKS

BACKGROUND OF THE INVENTION

1. Technical Field

The present invention pertains to wireless networks. In particular, the present invention pertains to detecting congestion within Ad-Hoc wireless networks and providing communications through the network that avoid the congestion to maintain network throughput.

2. Discussion of Related Art

An Ad-Hoc wireless network frequently includes nodes with a high concentration of traffic (e.g., packets, etc.). This traffic may be self-generated by a node with high traffic concentration, or be provided to that node from the network for relay to other network nodes. Network congestion tends to occur when these high concentration nodes are not bypassed, thereby resulting in packets being dropped and degradation of network throughput.

In order to avoid this situation, the congestion of a network node is measured and sent to other network nodes in order to enable routing to bypass the congested area. Congestion may be measured utilizing common techniques that measure queue utilization (i.e., the percentage of the storage capacity of a queue within a node being occupied by packets), packet drop rate (i.e., the rate packets are dropped from the node queue, or due to collisions), link failure rate (i.e., the link quality with respect to the percentage of packets that cannot be successfully transmitted using the link) and channel loading (i.e., the percentage a channel is utilized for sending traffic). Typically, congestion is sampled at a constant rate with the results being averaged.

The congested nodes are subsequently identified and bypassed based upon the congestion measurements. This may be accomplished by various conventional techniques. For example, a secondary route may be determined to bypass the primary routes that are congested. Further, several routes may be defined concurrently between source and destination nodes. When one of these routes is congested, another route may be utilized. Moreover, the congestion metric may be piggybacked within the transmission of the routing table (i.e., distance vector routing) or within the transmission of a Link State Advertisement (LSA) (i.e., link-state based routing).

However, the techniques described above suffer from several disadvantages. In particular, the congestion measurements described above may not provide an accurate measurement of true congestion. For example, the queue utilization measurement depends upon the size of the node queue. When the queue has a small storage capacity, small amounts of traffic may cause the queue utilization percentage to increase sufficiently to indicate congestion. If the queue has a large storage capacity, the queue may not be sufficiently filled and provide a low queue utilization percentage even though conditions include heavy traffic. The packet drop rate measurement is similarly connected to node queue size. A small queue storage capacity may easily drop packets even though there is no traffic congestion. A large queue storage capacity may store many packets, where no packets are dropped even though congestion has already occurred.

Further, the link failure rate may not accurately indicate the presence of congestion since link failure may be attributed to loss of radio connectivity due to mobility of network nodes. Link failure may further be attributed to a poor radio channel due to fading and multi-path interferences. Thus, a high link failure rate may not necessarily indicate occurrence of congestion.

In addition, channel loading is commonly measured by periodically sampling the channel. The channel loading value is one when the channel is busy, and zero if the channel is idle. This limitation of values is very coarse, and provides an inaccurate average due to the averaging of both busy and idle channel values. Further, the constant sampling for the measurement wastes processor power since measurements are performed for idle channels.

With respect to bypassing congested areas, determination of a secondary route (besides the primary routes) or plural routes requires the transmission of control packets to discover the routes. This significantly increases overhead and reduces the effectiveness of these techniques. Although a utilization measurement may be used to update the contention interval when a network node needs to access a communication channel using a Carrier Sense Multiple Access (CSMA) based protocol, this provides occasional or limited advantages based on simulation.

Conventional techniques send the congestion measurements within a broadcast of routing tables, or within a flood of Link State Advertisements (LSA). However, network nodes may not receive these items since congestion may have already occurred. This enables packets to be dropped due to the congestion.

SUMMARY

Accordingly, the present invention embodiments bypass congested links in a multi-hop Ad-Hoc wireless network to avoid dropping packets and degrading throughput. Initially, congestion is measured at each network node based on channel utilization for both transmission and reception of Time Division Multiple Access (TDMA) and Carrier Sense Multiple Access (CSMA) messages. The measured utilization is quantized to conserve transmission bandwidth. Non-uniform quantization is applied to enable the measured utilization to be quantized to the highest value within the quantization range prior to occurrence of congestion, thereby effectively providing early notification of the congestion. The quantized utilization is distributed with the original use costs of a communication link to the remaining network nodes by a Link State Advertisement (LSA) flood. Supplemental mechanisms (e.g., ACK and HELLO messages or packets) are utilized to increase the distribution reliability. After a network node receives the quantized utilization, the link cost is updated and used to select a routing path that minimizes the total costs from the source node to the destination node for a multi-hop network. No additional overhead is needed to select a secondary path to bypass the congested links.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF EXAMPLE EMBODIMENTS

The present invention embodiments measure congestion, preferably within Ad-Hoc wireless networks, based on communication channel utilization in order to avoid congested communication links. The present invention embodiments determine congestion by measuring the number of time slots used for transmission and reception of information, thereby providing an accurate representation of communication channel occupancy. This requires no periodic sampling since the measurements are made when the communication channel is busy.

With respect to Ad-Hoc wireless networks, conventional communication channel access techniques include Carrier Sense Multiple Access (CSMA) and Time Division Multiple Access (TDMA). The present invention embodiments accumulate separately for each network node the time slots utilized for TDMA and CSMA. The accumulated time slots for TDMA and CSMA are combined to indicate the congestion or utilization level for the particular node. The utilization level is quantized (e.g., $2^Q$ levels) and encoded to Q bits to conserve transmission bandwidth and provide an early warning of congestion. If congestion already occurs, transmission of the quantized utilization level to other network nodes becomes difficult. Accordingly, non-uniform quantization is applied to set the quantized utilization level to a high value prior to occurrence of congestion. This enables other network nodes to receive the quantized utilization level and invoke a new routing path to avoid congested links.

The quantized utilization level and an original link cost (associated with a communication link) are distributed to other network nodes within a Link State Advertisement (LSA) flood. Supplemental techniques are further utilized in order to increase the reliability of receiving the utilization information. For example, the quantized utilization level is sent in an acknowledgment (ACK) message or packet for a CSMA based data transmission. Further, the quantized utilization level may be sent in HELLO messages or packets that are transmitted to neighboring nodes in order to announce node existence. Since these messages or packets are sent using existing traffic, there is no additional overhead, except for the negligible number of bits encoding the quantized utilization level.

After receiving the quantized utilization level, network nodes use this information to determine a new link cost associated with the communication link. Since a path from a source node to a destination node is determined based on minimum link cost, the network nodes with congested links (or high quantized utilization levels) are avoided. A secondary path is further selected during congestion to avoid the congested primary routes (e.g., since there is no costly search for secondary paths).

Figure 1A:
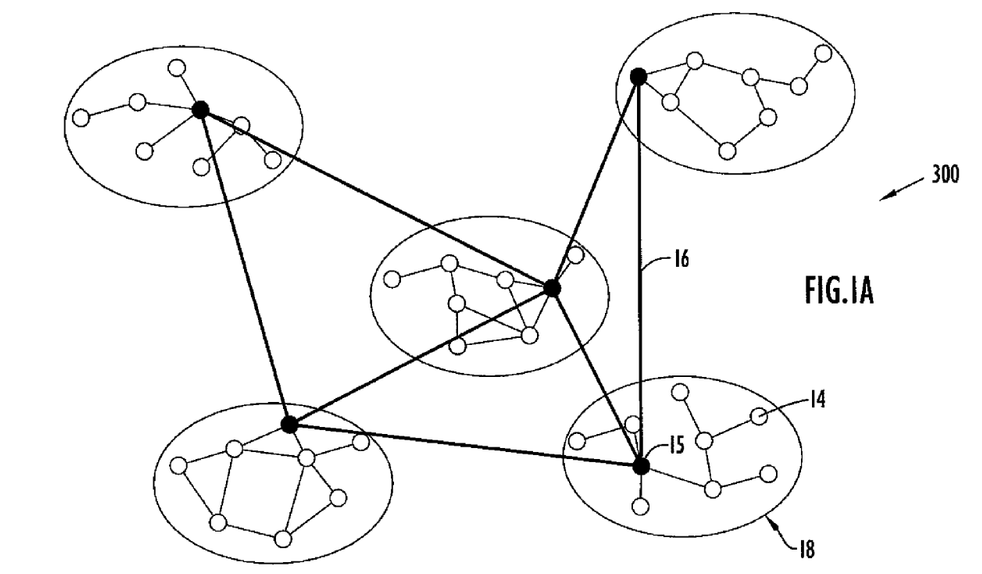
FIG. 1A is a diagrammatic illustration of network nodes arranged in an exemplary communication network and employing congestion detection and avoidance according to an embodiment of the present invention.

An exemplary Ad-Hoc wireless network including network nodes detecting and avoiding congestion according to an embodiment of the present invention is illustrated in FIG. 1A. This type of network does not include an infrastructure (e.g., there is no base station as in a cellular network, where a single-hop environment of a cellular network becomes a special case) and may be utilized in a hostile network environment (e.g., a tactical battlefield, etc.) with unfriendly jamming. Specifically, wireless network 300 includes a plurality of nodes 14 arranged in islands 18. Each island is in the form of a flat multi-hop network and includes corresponding island member nodes 14 (e.g., with an approximate maximum of fifty nodes) with one of those member nodes designated as an island head node 15. These island arrangements form a first tier of network 300 and facilitate communication within an island between the island head and member nodes and between the member nodes themselves. The head nodes of each island are in communication with each other and form a backbone network 16. The backbone network essentially forms a second tier of network 300 and facilitates communications between nodes of different islands (e.g., generally providing communications over greater distances). For example, a node A from a first island desires to transmit a message to node B of a second island. Node A transmits the message to a corresponding head node C of the first island that utilizes the second tier of network 300 to forward the message to a head node D of the second island. Head node D subsequently forwards the received message to destination node B. Alternatively, nodes 14 may be arranged to form a network including a single or any quantity of tiers.

Figure 1B:
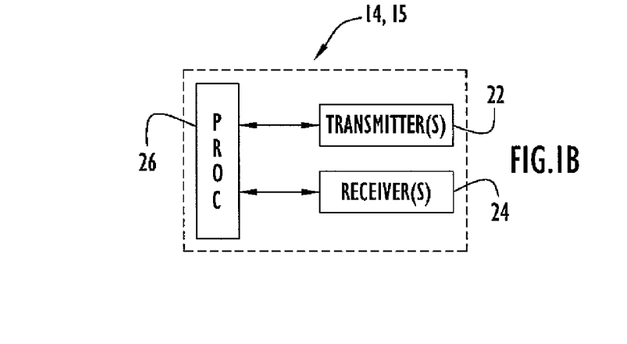
FIG. 1B is a block diagram of a network node of FIG. 1A according to an embodiment of the present invention.

A network node 14 according to an embodiment of the present invention is illustrated in FIG. 1B. Initially, the Ad-Hoc wireless network may include numerous communication channels. Different channels may be used for reservation and transmission of data, voice or video information. The network may employ TDMA and CSMA protocols, where each may be assigned different communication channels for media access. Specifically, node 10 includes one or more transmitters 22 to transmit over the respective communication channels, one or more receivers 24 to receive signals from the respective communication channels, and a processor 26. The processor is preferably implemented by a conventional microprocessor or controller and controls the node to transmit and receive messages for communications, and to perform the congestion detection, notification and avoidance described below. Each transmitter is preferably implemented by a conventional transmitter and transmits messages from the processor, preferably in the form of radio frequency (RF) signals and over one or more corresponding communication channels, in accordance with processor instructions. Each receiver 24 is typically implemented by a conventional receiver and configured to receive signals, preferably in the form of radio frequency (RE) signals and from one or more corresponding communication channels, transmitted by a transmitter of another node. The receiver receives transmitted signals and forwards the received signals to processor 26 for processing. Transmitters 22 and receivers 24 may alternatively be in the form of one or more transceivers to transmit and receive messages over the respective communication channels.

The node further includes an identification (ID) (e.g., a code or identification number) to identify the particular node and a database (not shown) to store information pertaining to neighboring nodes. An island head node 15 is substantially similar to node 14 described above, except node 15 may include independent transceivers for each network tier. The network node may alternatively be configured for various types of networks, may include various audio, video and other devices (e.g., microphone, speaker, display, antenna, etc.) for communication, and may accommodate any types of information (e.g., data, voice, image, etc.).

The network preferably employs a link-state type of routing protocol that is implemented on backbone network 16. The database of each island head node 15 maintains information enabling that island head to determine appropriate paths for routing messages through the network. The information typically relates to links between the various network head nodes. The island head databases are synchronized, in accordance with the routing protocol, by transference of database update packets or messages (e.g., Link-State Advertisements (LSA)) between island head nodes that provide network connectivity information. These packets are conventionally transmitted to each neighboring network head node via broadcast, multiple unicast or point-to-point messages (e.g., messages from a source node to a specific destination network node), in response to changes in network topology, an external network connected to network 300 or other modifications to the network facilitating changes in a node database. When a database update packet is received, a point-to-point acknowledgment packet may be transmitted to the source node from the destination node to indicate packet reception. In addition, each node (e.g., island head and member nodes) periodically broadcasts a neighbor discovery or HELLO message or packet. This packet basically advertises the presence of a node within the network and is typically utilized for a "Keep Alive" and neighbor discovery purposes.

With respect to communications between network 300 and other networks, the network may employ a Radio Open Shortest Path First (ROSPF) protocol. This protocol is basically a modified version of the conventional Open Shortest Path First (OSPF) protocol commonly utilized for Internet Protocol (IP) type networks. Since the OSPF protocol generates significant overhead when applied to Ad-Hoc networks (e.g., dynamic wireless networks without any routing infrastructure), such as network 300, that protocol has been modified to derive the ROSPF protocol suitable for use with wireless or radio networks. According to the ROSPF protocol, each node within network 300 maintains a routing database, including information enabling the node to determine an appropriate path for routing a message. The information contained within the node routing databases typically relates to links between the various network nodes. The ROSPF protocol is a link-state type routing protocol and provides for synchronization of node routing databases through transmission of Link-State Advertisement (LSA) packets to each network node. These packets are conventionally transmitted to each neighboring network node via broadcast or multiple point-to-point messages (e.g., messages from a source node to a specific destination network node) in response to changes in network topology, an external network connected to network 300 or other modifications to the network facilitating changes in a node database. When a database update packet is received, a point-to-point OSPF type acknowledgment packet is commonly transmitted to the source node from the destination node to indicate packet reception.

Figure 2:
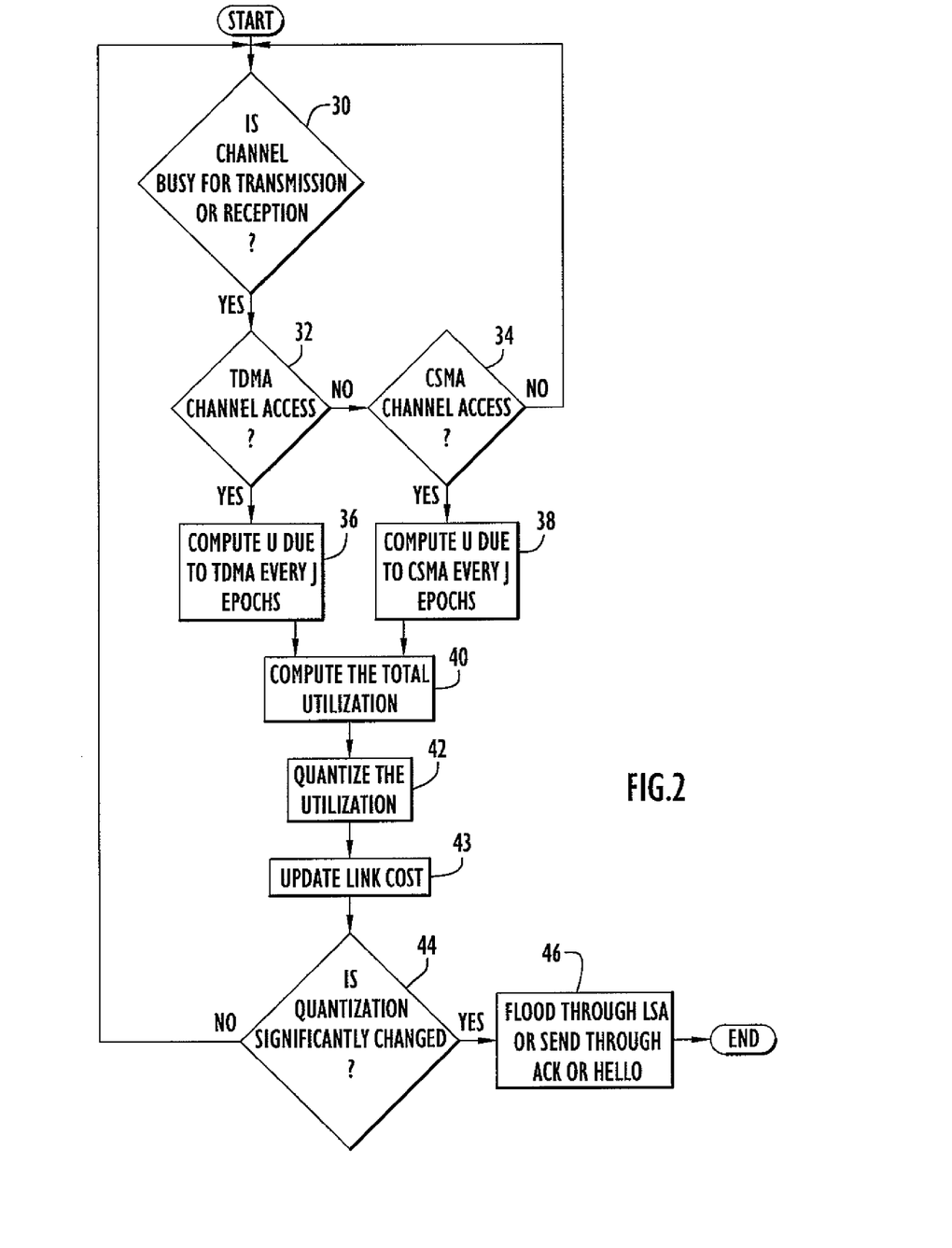
FIG. 2 is a procedural flowchart illustrating the manner in which a network node determines and transmits a utilization measurement for a communication link according to an embodiment of the present invention.

The manner in which a network node (or node processor 26) determines and transmits a utilization level of a communication link according to an embodiment of the present invention is illustrated in FIG. 2. Initially, the network node determines the presence of a busy channel at step 30. Once a channel becomes busy as determined at step 30, the network node determines the type of access (e.g., TDMA or CSMA) for the channel at steps 32, 34 in order to measure the utilization level for that access type as described below. The network node determines the utilization for each type of channel access (e.g., TDMA and CSMA) and use (e.g., transmission and reception) for a given time interval (or quantity of epochs) as each type of access and use occurs, and combines the utilizations for access type and use as described below. If the network node includes one transceiver (or transmitter/receiver pair), the node or radio transmits and receives using one channel at a time and a single utilization level is determined for the node as described below. When the network node includes plural transceivers (or transmitter/receiver pairs), transmission and reception may occur concurrently on different frequency bands and the utilization level is defined for each transceiver (or transmitter/receiver pair) that operates in a different band as described below. In any event, the utilization for a communication link of the node is determined in response to the particular communication link attaining a busy status.

Figure 3:
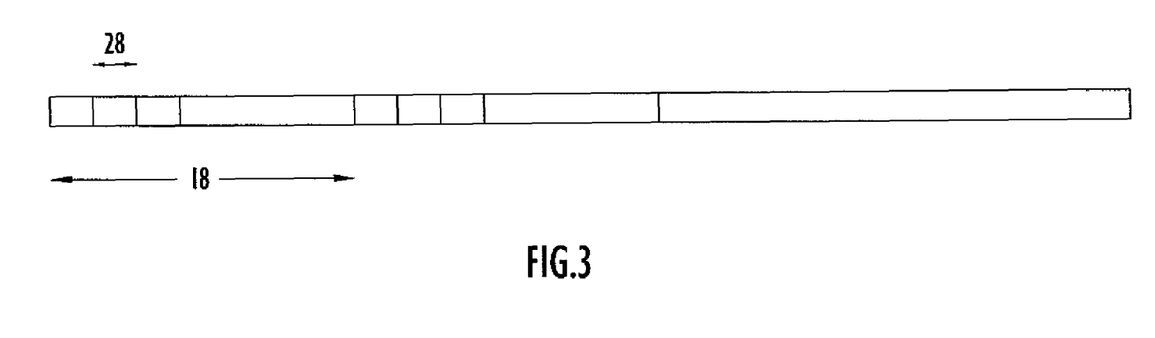
FIG. 3 is a diagrammatic illustration of an exemplary timing architecture.

In order to determine the utilization level or utilization ratio, time is partitioned into epochs and time slots. Referring to FIG. 3, time is divided into one or more epochs 18 with each epoch including a plurality of time slots 28. Dedicated time slots within the TDMA protocol are assigned, either statically or dynamically, in order for network nodes to send information (e.g., image, voice, etc.). In other words, each network node sends information in corresponding assigned time slots for that node. Since the time slot assignments are generally known, network nodes are aware of the specific time slots to monitor for reception of information. Once TDMA time slots are defined, the remaining time slots within the epochs are used for the CSMA protocol.

With respect to a spread spectrum communication system using a pseudo-noise code sequence, the time slot size (e.g., time slot duration) depends upon the chipping rate. For example, if each epoch has N time slots, and each time slot size is T seconds, the resulting epoch size is NT seconds (e.g., N slots/epoch*T seconds/slot=NT seconds/epoch). Generally, an Ad-Hoc wireless network may include numerous communication channels. Different channels may be used for reservation and transmission of data, voice or video information. The TDMA and CSMA protocols may be assigned different channels for media access. If each network node includes one transceiver (or transmitter/receiver pair), the node or radio transmits and receives using one channel at a time. In this case, the utilization level is defined for transmission and reception for all channels. When a network node includes plural transceivers (or transmitter/receiver pairs), transmission and reception may occur concurrently on different frequency bands and the utilization level is defined for each transceiver (or transmitter/receiver pair) that operates in a different band.

If the type of access is a TDMA type access as determined by the node at step 32 (FIG. 2), the node determines the utilization level for TDMA transmissions over a time interval (e.g., a quantity of epochs) at step 36. In particular, a TDMA epoch is an epoch that includes time slots assigned for the TDMA protocol. If there are J TDMA epochs in a period of P epochs with $S_{e_i}$ slots assigned to a TDMA epoch, $e_i$, the TDMA transmission utilization level or ratio, $U_{TDMA(tx)}^k$, for communication link, k, of the node is defined as follows.

$$U_{TDMA(tx)}^k = \frac{\sum_{i=0}^{J-1} S_{e_i}}{NP}$$

where N is the number of slots in an epoch, P is the period in epochs, $S_{e_i}$ is the TDMA slots assigned in epoch $e_i$, and J is the total number of TDMA epochs in a period. If the number of nodes in a network is M, the total number of point-to-point links is $M(M-1)/2$. The index, k, represents one such communication link. If the network node includes one transceiver (or transmitter/receiver pair), the node or radio transmits and receives using one channel at a time and a single utilization level is defined (e.g., k=1). When the network node includes plural transceivers (or transmitter/receiver pairs), transmission and reception may occur concurrently on different frequency bands and the utilization level is defined for each transceiver (or transmitter/receiver pair) that operates in a different band.

For example, if a TDMA epoch is the first epoch for every two epochs (e.g., the period of epochs, P, equals 2 and the total number of TDMA epochs, J, equals 1), the number of slots, N, in an epoch equals 60, and the TDMA slots $S_{e_0}$ assigned in epoch, $e_0$, equals 30, the TDMA transmission utilization level or utilization ratio for the corresponding communication link, k, of the node equals 0.25 (e.g., 30/(2*60)). Since the TDMA transmission utilization level represents the quantity of TDMA time slots divided by the total quantity of time slots (NP) in the epochs, the utilization level for TDMA transmissions resides between zero (e.g., no time slots in the epochs are being utilized as TDMA time slots) and one (e.g., all time slots in the epochs are being utilized as TDMA time slots).

When the type of access is a CSMA access as determined by the node at step 34, the node determines the utilization level or ratio for CSMA transmissions over a time interval (e.g., a quantity of epochs) at step 38. Initially, once TDMA time slots are defined, the remaining time slots are used for CSMA transmissions as described above, where the CSMA protocol utilizes control packets and data packets. Control packets include: Request to Send (RTS); Clear to Send (CTS); Acknowledgment (ACK); Negative Clear to Send (NCTS); and corresponding broadcast packets BRTS, BCTS and BACK. Each control packet utilizes a fixed number of time slots for transmission (e.g., this may be one or two time slots depending upon the data rate). Data packets include overhead traffic and user traffic. Overhead traffic includes traffic for neighbor discovery, network formation, LSA flood and other processes. User traffic includes application layer messages to be sent to the desired destinations. Overhead traffic and data traffic each include variable lengths and utilize a variable number of time slots.

The quantity of time slots for transmission of CSMA control packets are preferably determined separately for each packet type (e.g., RTS, CTS, ACK, NCTS, BRTS, BCTS, BACK, etc.). The time slot quantities are subsequently accumulated together to generate the total quantity of time slots, $S_c^k$, for CSMA control packet transmissions in a period of P epochs and for communication link, k, of the node. Similarly, the quantity of time slots for transmission of CSMA data packets are determined and accumulated to generate the total quantity of time slots, $S_d^k$, for CSMA data packet transmissions in a period of P epochs for communication link, k, of the node. The total number of time slots for CSMA traffic transmissions in a period of P epochs for a communication link, k, of the node is represented as the combination of the time slot quantities for the CSMA control and data packet transmissions (e.g., $S_c^k + S_d^k$).

The CSMA transmission utilization level or utilization ratio, $U_{CSMA(tx)}^k$, for communication link, k, of the node is defined as follows.

$$U_{CSMA(tx)}^k = (S_d^k + S_c^k)/NP$$

where $S_d^k$ is the total number of time slots used for CSMA data traffic transmissions at the kth communication link of the node, $S_c^k$ is the total number of time slots used for CSMA control traffic transmissions at the kth communication link of the node, N is the total number of time slots as described above and P is the period in epochs as described above. If the network node includes one transceiver (or transmitter/receiver pair), the node or radio transmits and receives using one channel at a time and a single utilization level is defined as described above. When the network node includes plural transceivers (or transmitter/receiver pairs), transmission and reception may occur concurrently on different frequency bands and the utilization level is defined for each transceiver (or transmitter/receiver pair) that operates in a different band.

Since the CSMA transmission utilization level represents the quantity of CSMA time slots divided by the total quantity of slots in the epochs (NP), the utilization level for CSMA transmissions resides between zero (e.g., no time slots in the epochs are being utilized as CSMA time slots) and one (e.g., all time slots in the epochs are being utilized as CSMA time slots).

Once the transmission utilizations for TDMA and CSMA accesses are determined, the node determines the total utilization level, $U^k$, for communication link, k, of the node at step 40. In particular, a transmission utilization level, $U_{tx}^k$, for communication link, k, of the node is determined by combining the transmission utilization levels for the TDMA and CSMA accesses for the communication link described above. This is represented as follows.

$$U_{tx}^k = U_{TDMA(tx)}^k + U_{CSMA(tx)}^k$$

The total utilization level, $U^k$, for communication link, k, of the node is determined by combining both the transmission utilization level, $U_{tx}^k$, and the reception utilization level, $U_{rx}^k$, for the communication link. The reception utilization level or ratio for a communication link is determined in substantially the same manner described above for the transmission utilization level in response to a channel being busy for reception and with respect to received time slots. The total utilization level (transmission and reception), $U^k$, for communication link, k, of the node is represented as follows.

$$U^k = U_{tx}^k + U_{rx}^k$$

If the network node includes one transceiver (or transmitter/receiver pair), the node or radio transmits and receives using one channel at a time and a single utilization level is defined as described above. When the network node includes plural transceivers (or transmitter/receiver pairs), transmission and reception may occur concurrently on different frequency bands and the utilization level is defined for each transceiver (or transmitter/receiver pair) that operates in a different band.

Since the total utilization level basically represents the quantity of time slots utilized (for transmission and reception) divided by the total quantity of time slots in the epochs, the total utilization level resides between zero (e.g., no time slots in the epochs are being utilized) and one (e.g., all time slots in the epochs are being utilized).

Once the node determines the total utilization level for the communication link, the total utilization level is quantized by the node at step 42. In particular, the total utilization level is quantized to L levels requiring $\text{Log}_2$ L bits for storage. The quantization conserves the quantity of bits for transmission to provide minimal overhead. Generally, uniform quantization employs a constant quantization step, while non-uniform quantization employs a variable quantization step that may accommodate early warning of congestion as described below.

With respect to uniform quantization, the quantization step is expressed as 1/L (since the total utilization level is expressed as a ratio and has a value between zero and one as described above). The quantized value, $U_{Quantization}^k$, for the total utilization level of communication link, k, of the node is expressed as follows.

$$U_{quantization}^k = \frac{l}{L} \text{ if } \frac{l-1}{L} < U < \frac{l}{L} \text{ where } l = 1 \text{ to } L.$$

Once the node determines the quantized utilization level, the quantized utilization level is encoded by the node using Q bits, where the total number of quantization levels, L, is expressed as $L=2^Q$. For example, a two bit encoding scheme may be utilized (e.g., Q=2 and L=4), where the quantized utilization levels may include 0.25, 0.50, 0.75 and 1.0 with each level being associated with a corresponding value in the bit range of zero to three. The quantization and coding is illustrated, by way of example, in Table I below.

TABLE I

| Encoded Utilization | Quantized Utilization | Utilization |
|---|---|---|
| 0 | 0.25 | 0.0-0.25 |
| 1 | 0.50 | 0.25-0.50 |
| 2 | 0.75 | 0.50-0.75 |
| 3 | 1 | 0.75-1.00 |

With respect to non-uniform quantization, the quantization step is variable. In other words, the difference between successive quantization levels may not necessarily be constant. The quantization step is controlled to set the quantized utilization to the highest value prior to reaching the congestion level. This effectively provides early warning to other network nodes that congestion is to occur and increases the likelihood other network nodes can successfully receive the distributed total utilization level in order to select an alternative route before congestion actually exists.

For example, a non-uniform quantization scheme that may be utilized employing a two bit encoding scheme (e.g., Q=2 and L=4) is illustrated in Table II.

TABLE II

| Encoded Utilization | Quantized Utilization | Utilization |
|---|---|---|
| 0 | 0.2 | 0.0-0.2 |
| 1 | 0.4 | 0.2-0.4 |
| 2 | 0.6 | 0.4-0.6 |
| 3 | 1.0 | 0.6-1.0 |

The quantization step is 0.2 for total utilization levels less than or equal to 0.6, and 0.4 for total utilization levels larger than 0.6. This scheme assumes that a total utilization level of 0.6 is sufficiently high enough to commence bypassing a communication link. Since a higher quantized utilization level results in a greater likelihood a communication link is bypassed by network nodes as described below, the earlier the quantized utilization level is increased, the earlier the congested link is bypassed. Thus, controlling the quantization level controls the early warning time to combat traffic congestion.

Once the node determines the quantized utilization level, a link cost, $C^k$, for communication link, k, of the node is updated by the node based on the quantized utilization level at step 43. The link cost defines the cost of using a particular communication link. For example, a simple link cost includes the hop count or quantity of hops utilized by the communication link. In a sensor network with battery power conservation as a priority, the link cost is defined to be a high value when a shortage of battery power exists. Since transmitting a message using the highest data rate is a consideration in order to improve throughput, the link cost is increased for links operating at low data rates. It is to be understood that the link cost is based on any desired parameters and be determined in any fashion depending upon the particular application, and network requirements and characteristics. The updated link cost, $C^k$, for communication link, k, of the node is defined as follows.

$$C^k = U_{Quantization}^k C_0^k$$

where $U_{Quantization}^k$ is the quantized utilization level for communication link, k, of the node and $C_0^k$ is the original link cost for communication link, k, of the node. Thus, the updated link cost is proportional to the quantized utilization level for the communication link. In other words, an increase in the quantized utilization level for a communication link increases the link cost, while the link cost decreases with a decreased quantized utilization level. If the network node includes one transceiver (or transmitter/receiver pair), the node or radio transmits and receives using one channel at a time and a single cost is defined. When the network node includes plural transceivers (or transmitter/receiver pairs), transmission and reception may occur concurrently on different frequency bands and the cost is defined for each transceiver (or transmitter/receiver pair) that operates in a different band. Since an LSA is transmitted with the quantized utilization information (and not the routing table itself), the node updates the node routing table to reflect the updated link cost.

Figure 4:
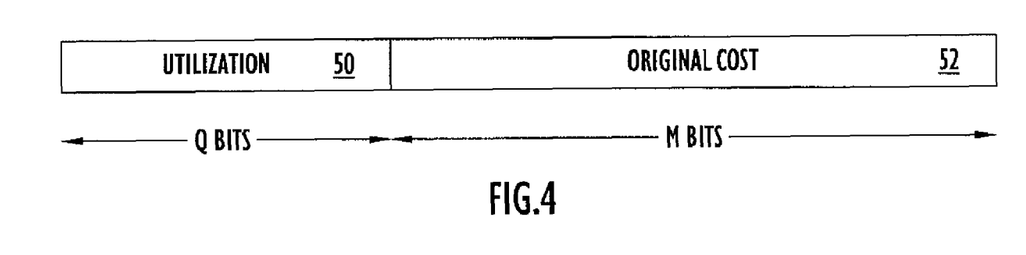
FIG. 4 is a diagrammatic illustration of an exemplary transmission architecture within an LSA for a utilization measurement and an original link cost for a communication link.

If the quantized utilization level has changed from the previous utilization level as determined by the node at step 44, the new quantized utilization level is encoded as described above and flooded by the node to the entire network at step 46. In particular, the encoded utilization level is preferably transmitted by employing the LSA flood described above. Referring to FIG. 4, each LSA includes a link cost, $C_0$, associated with the communication link for each adjacent neighbor. If an original link cost 52 occupies M bits within an LSA for transmission, the addition of a quantized utilization level 50 including Q bits provides a total of M+Q bits for transmission in the LSA. Since the value of Q is typically small, the addition of the encoded utilization level consumes a negligible amount of bandwidth.

The LSA flood typically utilizes a broadcast for distribution of the information with no guarantee of reception by each node. However, neighbors of a congested node need to receive this utilization information in order to avoid routing through that congested node. Accordingly, supplemental mechanisms are employed in addition to the LSA flood to ensure receipt of the utilization information. In particular, each CSMA message in accordance with the standard IEEE802.11 protocol includes the following packet transmission sequence: RTS; CTS; message; and ACK. In order to avoid introduction of additional overhead, the encoded utilization level is piggybacked within the ACK packet. The increased overhead includes the few bits of the encoded utilization level incorporated into the original ACK packet. For example, two bits may be added for encoding a quantized utilization level including a quantized value from among four quantization levels, where these added bits provide minimal or substantially no burden to the existing ACK packet. The transmission of the encoded utilization level within ACK packets depends on the availability of message exchange between the congested node and the corresponding neighbors. In some situations, these types of transmissions may not be reliable.

In order to ensure neighboring nodes receive the encoded utilization level, this information may further be sent using HELLO messages or packets. HELLO messages are sent periodically from a node to indicate the presence of that node to neighboring nodes. Similar to the ACK packets, the increase within the HELLO messages are the bits, Q, of the encoded utilization level, where the number of bits, Q, is typically small. However, the transmission of the encoded utilization level within HELLO messages increases the probability neighboring nodes receive the utilization information. When neighboring nodes receive the utilization information, the routing tables of the receiving nodes are updated to avoid the communication link of the congested node as described below. Thus, the congested node is avoided without any additional overhead to search for secondary routes. The transmission of the encoded utilization level within ACK or HELLO packets is supplemental to the LSA flood.

The node typically stores the encoded quantization level for a communication link in a node storage element (e.g., buffer, queue, stack, processor 26, etc.) until an LSA, ACK or HELLO packet is to be transmitted by the node. Since these packets typically include information pertaining to the transmitted node, the receiving nodes know the node or communication link to which the utilization pertains. In the case, where a node includes plural transceivers with different transceivers operating on different frequency bands, a band indication is placed in the packets to indicate the band corresponding to the utilization. As the LSA, ACK and HELLO packets are arranged for transmission, the node retrieves the utilizations from the node storage element for placement in the packets.

Figure 5:
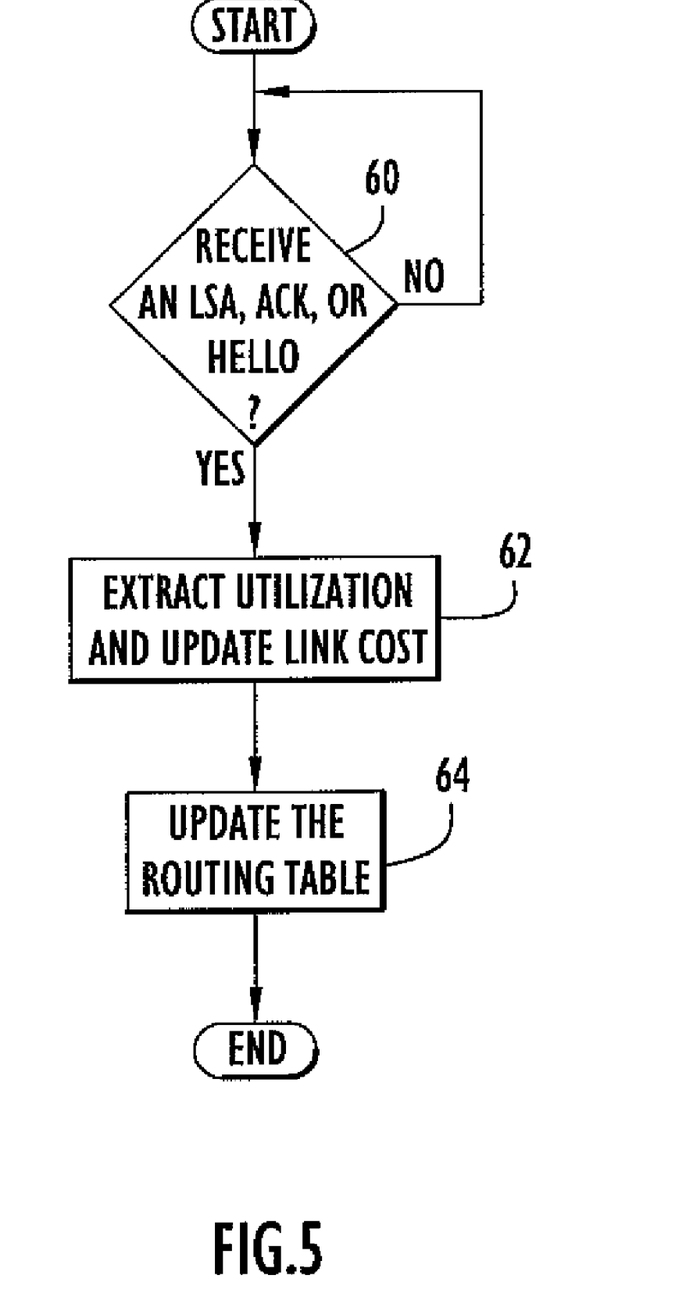
FIG. 5 is a procedural flowchart illustrating the manner in which a network node receives and processes a utilization measurement according to an embodiment of the present invention.

The manner in which a network node (or node processor) processes the received utilization level is illustrated in FIG. 5. In particular, the network node determines the presence of an LSA, ACK or HELLO message at step 60. When one of these messages or packets is present, the node extracts the encoded utilization level and original link cost, $C_0^k$, for communication link, k, of the originating node (e.g., the node to which the received utilization pertains) from the packet and updates the corresponding link cost at step 62. Initially, the node extracts and decodes the encoded utilization level to produce the quantized utilization level for the communication link. The quantized utilization level is used to update the link cost (e.g., which is included within an LSA or resides in the node routing table). The updated link cost, $C^k$, for communication link, k, of the originating node is determined as described above, and is expressed as follows.

$$C^k = U_{Quantization}^k C_0^k$$

where $U_{Quantization}^k$ is the quantized utilization level for communication link, k, of the originating node and $C_0^k$ is the original link cost for communication link, k, of the originating node. Thus, the updated link cost is proportional to the quantized utilization level for the communication link. In other words, an increase in the quantized utilization level for a communication link increases the link cost, while the link cost decreases with a decreased quantized utilization level. If the network node includes one transceiver (or transmitter/receiver pair), the node or radio transmits and receives using one channel at a time and a single cost is defined. When the network node includes plural transceivers (or transmitter/receiver pairs), transmission and reception may occur concurrently on different frequency bands and the cost is defined for each transceiver (or transmitter/receiver pair) that operates in a different band.

The node subsequently updates the node routing table to reflect the updated link cost at step 64. Once the routing table is updated, a route or path can be selected from a source node to a destination node. This is accomplished by determining the path or route with the lowest accumulated link cost along that route. The total cost, $C^Y$, for a route between a source node and a destination node with one or more hops is the summation of the link costs, $C^Y$, for each communication link in the path, which is expressed as follows.

$$C = \sum_{Y=1}^{Z} C^Y$$

where $C^Y$ is the cost for a communication link in the path described above, and Z is the number of hops in the path between the nodes.

Basically, the utilization level resides between zero and one as described above. If the utilization level is small (e.g., near zero), this indicates that the link is not used often and, therefore, preferred for routing. This type of link further includes a low link cost as described above. However, a high utilization level (e.g., closer to one) indicates a congested link that should be avoided. This type of link includes a high link cost as described above. Since congested links include high link cost values, the minimal cost approach should avoid congested links in the path determination.

It will be appreciated that the embodiments described above and illustrated in the drawings represent only a few of the many ways of implementing a method and apparatus for early warning of congestion in Ad-Hoc wireless networks.

The communication networks employing the present invention nodes may include any quantity of those nodes and may be of any type of network (e.g., Ad-Hoc or other type of wireless network, etc.). The network nodes may be arranged in any fashion into any quantity of islands each having any quantity of nodes. The backbone network may include any quantity of island head nodes, while communications within an island and between neighboring island head nodes of the backbone network may utilize the same or different transmission frequencies. The formation of islands and designation of island head nodes may be predetermined or accomplished dynamically via any conventional or other algorithm or technique. The nodes may communicate via any suitable communications medium (e.g., wired or wireless communication devices, etc.).

The present invention node may include any quantity of conventional or other transmitters and/or transceivers, where each transmitter or transceiver may transmit signals at any suitable frequency and in any suitable energy form (e.g., radio signals, microwave, optical signals, etc.). Further, the present invention node may include any quantity of conventional or other receivers and/or transceivers, where each receiver or transceiver may receive signals at any suitable frequency and in any suitable energy form (e.g., radio signals, microwave, optical signals, etc.). The present invention node may include any quantity of independent transmitting and/or receiving devices, may utilize any quantity of frequency channels of any desired frequencies and may send voice and/or data (e.g., images, video, etc.). The present invention node may employ any conventional access scheme or protocol to access and/or transmit information. The present invention node may further include any quantity of any types of input or control devices (e.g., buttons, switches, etc.) to control node operation. The node may be in the form of any type of radio unit or other communications device. The present invention node may include any type of identification including any quantity of any type of symbols or characters (e.g., numeric, alphabetic, alphanumeric, etc).

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of hardware and/or software modules or units, processors or other processing devices or circuits. The software for the processor of the present invention node may be implemented in any suitable computer language, and could be developed by one of ordinary skill in the computer and/or programming arts based on the functional description contained herein and the state diagram illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate detection, notification and/or avoidance of congestion in the manner described above.

The packets or messages transmitted by the network (e.g., HELLO, ACK, LSA, etc.) may be of any size, may have any format and may contain any desired information. The packets may be transmitted in response to any conditions or message sequence. The various messages or packets may include any identifier to identify the type of message or packet. The packets may be broadcasted or transmitted any quantity of times.

The timing architectures may be of any quantity and include any quantity of any types of epochs (e.g., CSMA, TDMA, etc.) with any quantity of any types of time slots. The architecture may include any desired period, where the time slots and epochs may include any desired durations. The time slots may be reserved or assigned in any manner (e.g., static, dynamic, central, distributive, etc.) based on any desired conditions, where the architecture (e.g., epochs, time slots, etc.) may be arranged in any fashion. The time slot assignment may assign any time slots from any epochs to corresponding nodes in any desired order and may include any quantity of time slots assigned to any protocols (e.g., TDMA, CSMA, etc.). The architecture may include any quantity of time slots (e.g., reserved for specific purposes, for a particular application, etc.) arranged in any fashion.

The utilization may be determined over any desired time interval (e.g., any quantity of epochs or time slots, etc.) and may be individually determined based on access type (e.g., CSMA or TDMA), channel use (e.g., transmission or reception) or any other criteria. The individual utilizations may be used individually, or combined in any fashion (e.g., summed, weighted, averaged, etc.), to provide an indication of congestion. The congestion may be determined based on any suitable parameter of channel use or occupancy (e.g., time slot utilization, idle channels or idle time slots, etc.).

The utilization may be quantized in any desired fashion, where the quantization range may be of any values or value ranges and include any quantity of desired quantization levels. The quantization may be uniform and include any desired quantization step. Alternatively, the quantization may be non-uniform, where each successive quantization level may include the same or different quantization step (or difference). The quantization may be configured to provide a sufficiently high quantized value at any suitable utilization level to provide early warning of a congested state. The quantized utilization level may be encoded in any fashion (e.g., successive numbers or ordering, characters, encryption, etc.) and include any quantity of characters, symbols or bits.

The link cost may be determined based on any desired parameters (e.g., data rate, power, etc.) and may include any desired range of values. The link cost may be updated by combing the link cost in any fashion with the utilization or other parameters. Any quantity of utilization values, link costs and other information for any quantity of communication links may be embedded or piggybacked within any suitable packets (e.g., database update or LSA, ACK, HELLO, etc.). Alternatively, this information may be transmitted in respective packets or messages of any quantity. The database update and other packets may be transmitted at any desired intervals and/or in response to any desired events or conditions. The node database and storage element may be implemented by any conventional database or other storage structure (e.g., processor memory, external memory, file, data structure (e.g., array, queue, stack, etc.), etc.) and may have any desired storage capacity to contain any desired information (e.g., routing table, utilizations, etc.).

The utilization may be transmitted via any suitable transmission techniques (e.g., flooding or broadcast, multicast, point-to-point, etc.). The utilization may be transmitted for each determination or measurement, or in response to the utilization varying in any desired amount from a prior utilization measurement (e.g., total utilization or quantized utilization different than the previous measurement, any of the individual utilizations (e.g., TDMA, CSMA, transmission, reception, etc.) being different by any suitable amount from the previous measurement, etc.).

The received encoded utilization may be decoded in any suitable fashion and utilized to update the link cost in the node routing table. The node may include any quantity of communication links, where the utilization and/or cost may be determined for one or more links based on any desired criteria (e.g., operating band, quantity of transceivers, quantity of channels, etc.).

The cost of a route or path may be determined by combining costs of the communication links within the paths in any fashion. Any suitable link cost values may indicate a congested link (e.g., high or low values, etc.). Routing paths may be determined in any suitable manner (e.g., a total cost or each link cost being less than (or greater than) a threshold, minimum (or maximum) path cost, etc.).

It is to be understood that the present invention is not limited to the applications or networks described herein, but may be utilized for various communication applications or networks, especially wireless Ad-Hoc radio networks. The network may include one or more of the congestion detection, notification and avoidance of the present invention embodiments.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.), and/or may be downloaded (e.g., in the form of carrier waves, packets, etc.) to communication nodes, networks or systems via any suitable communications medium.

From the foregoing description, it will be appreciated that the invention makes available a novel method and apparatus for early warning of congestion in Ad-Hoc wireless networks, wherein congestion is detected within Ad-Hoc wireless networks in order to provide communications through the network that avoid the congestion to maintain network throughput.

Having described preferred embodiments of a new and improved method and apparatus for early warning of congestion in Ad-Hoc wireless networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication unit to transmit and receive information within a wireless Ad-Hoc communications network and to measure congestion comprising:
    a transmitter to transmit outgoing information to at least one other communication unit within said network;
    a receiver to receive incoming information from at least one other communication unit within said network; and
    a processor to control said transmission and reception of said outgoing and incoming information, wherein said information is conveyed within a series of time slots and said processor is configured to:
        determine a congestion value for said communication unit within a value range based on an amount of utilization of said time slots for communication within a predetermined time interval, wherein each value within said value range is associated with a corresponding time slot utilization level, and wherein said determined congestion value is associated with a time slot utilization level greater than said amount of utilization to indicate the presence of congestion prior to said amount of utilization indicating actual occurrence of congestion and to alter a cost for a communication link associated with said communication unit to impede utilization of that communication link for routing; and
        facilitate transmission of said determined congestion value to at least one other communication unit within said network to enable routing through said network that avoids said congestion in accordance with said altered cost for said communication link.

2. The communication unit of claim 1, wherein said network employs a plurality of communication protocols, and said processor is further configured to:
    determine an amount of time slot utilization for each communication protocol, wherein said protocol utilization amounts are combined to produce said utilization amount for communication.

3. The communication unit of claim 2, wherein said processor is further configured to:
    determine an amount of time slot utilization for respective transmissions and receptions of information for each communication protocol, wherein said utilization amounts for transmission and reception for each communication protocol are combined to produce said utilization amount for that protocol.

4. The communication unit of claim 2, wherein said communication protocols include Time Division Multiple Access (TDMA) and Carrier Sense Multiple Access (CSMA).

5. The communication unit of claim 4, wherein said CSMA protocol includes control packets and data packets, and said processor is further configured to:
    determine an amount of time slot utilization for respective control packets and data packets, wherein said utilization amounts for said control and data packets are combined to produce said utilization amount for said CSMA protocol.

6. The communication unit of claim 1, wherein said processor is further configured to:
    quantize said amount of utilization for communication to a value within a quantization range, wherein said congestion value is based on said quantized utilization.

7. The communication unit of claim 6, wherein said processor is further configured to:
    encode said quantized utilization to produce said congestion value for transference to at least one other communication unit within said network.

8. The communication unit of claim 1, wherein said transmission transmits said congestion value within one or more of a database update packet, a neighbor discovery packet and an acknowledgment packet.

9. The communication unit of claim 1, wherein said processor is further configured to:
    determine said cost for said communication link associated with said communication unit based on a product of a quantized utilization amount and a current cost to update a routing table within said communication unit with said determined cost.

10. The communication unit of claim 1, wherein said processor is further configured to:
    receive said congestion value from another communication unit, to determine a cost for a communication link associated with said other communication unit based on a product of a current cost and a quantized utilization amount within said received congestion value, and to update a routing table within said communication unit with said determined cost.

11. The communication unit of claim 10, wherein said processor is further configured to:
    determine a path through said network avoiding congested communication units for transmission of information by selecting said path through said network based on a minimum cost from a source to a destination.

12. The communication unit of claim 1, wherein said incoming and outgoing information are in the form of radio signals.

13. A communication unit to transmit and receive information within a communications network and to measure congestion comprising:
    a transmitter to transmit outgoing information to at least one other communication unit within said network;
    a receiver to receive incoming information from at least one other communication unit within said network; and
    a processor to control said transmission and reception of said outgoing and incoming information, wherein said information is conveyed within a series of time slots and said processor is configured to:
        determine a congestion value for said communication unit based on an amount of utilization of said time slots for communication within a predetermined time interval, wherein said determining a congestion value includes:

quantizing said amount of utilization for communication to a value within a quantization range by applying a non-uniform quantization to said amount of utilization to produce said quantized utilization within said quantization range, wherein said congestion value is based on said quantized utilization and said non-uniform quantization includes at least two quantization steps with different values; and facilitate transmission of said determined congestion value to at least one other communication unit within said network.

14. The communication unit of claim 13, wherein said non-uniform quantization produces said quantized utilization with a value within said quantization range representing the presence of congestion prior to said amount of utilization indicating actual occurrence of congestion to provide early notification of said congestion.

15. A method of measuring congestion of a communication unit within a wireless Ad-Hoc communications network and enabling other communication units to avoid congested communication units, wherein information is conveyed in said network within a series of time slots, said method comprising:

(a) determining a congestion value for said communication unit within a value range based on an amount of utilization of said time slots for communication within a predetermined time interval, wherein each value within said value range is associated with a corresponding time slot utilization level, and wherein said determined congestion value is associated with a time slot utilization level greater than said amount of utilization to indicate the presence of congestion prior to said amount of utilization indicating actual occurrence of congestion and to alter a cost for a communication link associated with said communication unit to impede utilization of that communication link for routing; and (b) transmitting said determined congestion value to at least one other communication unit within said network to enable routing through said network that avoids said congestion in accordance with said altered cost for said communication link.

16. The method of claim 15, wherein said network employs a plurality of communication protocols, and step (a) further includes:

(a.1) determining an amount of time slot utilization for each communication protocol, wherein said protocol utilization amounts are combined to produce said utilization amount for communication.

17. The method of claim 16, wherein step (a.1) further includes: (a.1.1)determining an amount of time slot utilization for respective transmissions and receptions of information for each communication protocol, wherein said utilization amounts for transmission and reception for each communication protocol are combined to produce said utilization amount for that protocol.

18. The method of claim 16, wherein said communication protocols include Time Division Multiple Access (TDMA) and Carrier Sense Multiple Access (CSMA).

19. The method of claim 18, wherein said CSMA protocol includes control packets and data packets, and step (a.1) further includes:

(a.1.1)determining an amount of time slot utilization for respective control packets and data packets, wherein said utilization amounts for said control and data packets are combined to produce said utilization amount for said CSMA protocol.

20. The method of claim 15, wherein step (a) further includes:

(a.1) quantizing said amount of utilization for communication to a value within a quantization range, wherein said congestion value is based on said quantized utilization.

21. The method of claim 20, wherein step (a) further includes:

(a.2) encoding said quantized utilization to produce said congestion value for transference to at least one other communication unit within said network.

22. The method of claim 15, wherein step (b) further includes:

(b.1) transmitting said congestion value within one or more of a database update packet, a neighbor discovery packet and an acknowledgment packet.

23. The method of claim 15, wherein step (a) further includes:

(a.1) determining said cost for said communication link associated with said communication unit based on a product of a quantized utilization amount and a current cost and updating a routing table within said communication unit with said determined cost.

24. The method of claim 15, further including:

(c) receiving said congestion value from another communication unit;

(d) determining a cost for a communication link associated with said other communication unit based on a product of a current cost and a quantized utilization amount within said received congestion value; and (e) updating a routing table within said communication unit with said determined cost.

25. The method of claim 24, further including:

(f) determining a path through said network avoiding congested communication units for transmission of information by selecting said path through said network based on a minimum cost from a source to a destination.

26. The method of claim 15, wherein said communication unit transmits and receives information in the form of radio signals.

27. A method of measuring congestion of a communication unit within a communications network and enabling other communication units to avoid congested communication units, wherein information is conveyed in said network within a series of time slots, said method comprising:

(a) determining a congestion value for said communication unit based on an amount of utilization of said time slots for communication within a predetermined time interval, wherein step (a) further includes:

(a.1) quantizing said amount of utilization for communication to a value within a quantization range, wherein said congestion value is based on said quantized utilization, and wherein step (a.1) further includes:

(a.1.1)applying a non-uniform quantization to said amount of utilization to produce said quantized utilization within said quantization range, wherein said non-uniform quantization includes at least two quantization steps with different values; and (b) transmitting said determined congestion value to at least one other communication unit within said network.

28. The method of claim 27, wherein said non-uniform quantization produces said quantized utilization with a value within said quantization range representing the presence of congestion prior to said amount of utilization indicating actual occurrence of congestion to provide early notification of said congestion.

29. A wireless Ad-Hoc communications network comprising:
a plurality of communication units for transferring information therebetween, wherein said information is conveyed within a series of time slots, wherein said communication units each determine a respective congestion value within a value range based on a corresponding amount of utilization of said time slots for communication within a predetermined time interval, wherein each value within said value range is associated with a corresponding time slot utilization level, and wherein said determined respective congestion value is associated with a time slot utilization level greater than said corresponding amount of utilization to indicate the presence of congestion prior to said corresponding amount of utilization indicating actual occurrence of congestion and to alter a cost for a communication link associated with a corresponding communication unit to impede utilization of that communication link for routing, and wherein said communication units each transmit said congestion value to other communication units to enable routing through said network in accordance with said altered cost for said corresponding communication links in order to avoid congested communication units within said network.

30. The communications network of claim 29, wherein said network employs a plurality of communication protocols, and said communication units each determine a corresponding amount of time slot utilization for each communication protocol, wherein said protocol utilization amounts are combined to produce said corresponding utilization amount for communication.

31. The communications network of claim 30, wherein said communication units each determine a corresponding amount of time slot utilization for respective transmissions and receptions of information for each communication protocol, wherein said utilization amounts for transmission and reception for each communication protocol are combined to produce said utilization amount for that protocol.

32. The communications network of claim 30, wherein said communication protocols include Time Division Multiple Access (TDMA) and Carrier Sense Multiple Access (CSMA).

33. The communications network of claim 32, wherein said CSMA protocol includes control packets and data packets, and said communication units each determine a corresponding amount of time slot utilization for respective control packets and data packets, wherein said utilization amounts for said control and data packets are combined to produce said utilization amount for said CSMA protocol.

34. The communications network of claim 29, wherein said communication units each quantize said corresponding amount of utilization for communication to a value within a quantization range, wherein said respective congestion value is based on said quantized utilization.

35. The communications network of claim 34, wherein said communication units each encode a corresponding quantized utilization to produce said respective congestion value for transference to other communication units within said network.

36. The communications network of claim 29, wherein said communication units each transmit said respective congestion value within one or more of a database update packet, a neighbor discovery packet and an acknowledgment packet.

37. The communications network of claim 29, wherein said communication units each determine said cost for said communication link associated with that communication unit based on a product of a quantized utilization amount and a current cost and update a routing table within said communication unit with said determined cost.

38. The communications network of claim 29, wherein said communication units each receive said congestion value from another communication unit, determine a cost for a communication link associated with said other communication unit based on a product of a current cost and a quantized utilization amount within said received congestion value, and update a routing table within said communication unit with said determined cost.

39. The communications network of claim 38, wherein said communication units each determine a path through said network avoiding congested communication units for transmission of information by selecting said path through said network based on a minimum cost from a source to a destination.

40. The communications network of claim 29, wherein said transferred information is in the form of radio signals.

41. A communications network comprising:
a plurality of communication units for transferring information therebetween, wherein said information is conveyed within a series of time slots, and wherein said communication units each determine a respective congestion value based on a corresponding amount of utilization of said time slots for communication within a predetermined time interval and transmit said congestion value to other communication units in order to avoid congested communication units within said network;
wherein said communication units each quantize said corresponding amount of utilization for communication to a value within a quantization range, wherein said respective congestion value is based on said quantized utilization; and
wherein said communication units each apply a non-uniform quantization to said corresponding amount of utilization to produce said quantized utilization within said quantization range, wherein said non-uniform quantization includes at least two quantization steps with different values.

42. The communications network of claim 41, wherein said non-uniform quantization produces said quantized utilization with a value within said quantization range representing the presence of congestion prior to said corresponding amount of utilization indicating actual occurrence of congestion to provide early notification of said congestion.

* * * * *